(12) United States Patent
Homma et al.

(10) Patent No.: US 12,262,187 B2
(45) Date of Patent: Mar. 25, 2025

(54) SPEAKER APPARATUS AND CHAIR

(71) Applicant: SONY GROUP CORPORATION, Tokyo (JP)

(72) Inventors: Atsushi Homma, Tokyo (JP); Takahiro Hayasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 182 days.

(21) Appl. No.: 17/999,404

(22) PCT Filed: Apr. 20, 2021

(86) PCT No.: PCT/JP2021/016041
§ 371 (c)(1),
(2) Date: Nov. 21, 2022

(87) PCT Pub. No.: WO2021/246069
PCT Pub. Date: Dec. 9, 2021

(65) Prior Publication Data
US 2023/0209261 A1  Jun. 29, 2023

(30) Foreign Application Priority Data
Jun. 1, 2020 (JP) ................................ 2020-095562

(51) Int. Cl.
*H04R 5/02* (2006.01)
*A47C 1/12* (2006.01)
(Continued)

(52) U.S. Cl.
CPC ............... *H04R 5/023* (2013.01); *A47C 1/12* (2013.01); *A47C 7/727* (2018.08); *B60N 2/90* (2018.02);
(Continued)

(58) Field of Classification Search
CPC ...... H04R 5/023; H04R 1/2826; H04R 1/345; H04R 2499/13; H04R 1/2819; B60N 2/90;
(Continued)

(56) References Cited

U.S. PATENT DOCUMENTS 8,913,777 B2 * 12/2014 Pelliccio .................. B60N 2/64
381/86
11,647,327 B2 * 5/2023 Oswald .................. H04R 5/023
381/86
(Continued)

FOREIGN PATENT DOCUMENTS

| JP | 2007-053622 A | 3/2007 |
|---|---|---|
| JP | 2019-536352 A | 12/2019 |
| NO | 2019/124149 A1 | 6/2019 |

OTHER PUBLICATIONS

International Search Report and Written Opinion of PCT Application No. PCT/JP2021/016041, issued on Jul. 6, 2021, 09 pages of ISRWO.

*Primary Examiner* — Xu Mei
(74) *Attorney, Agent, or Firm* — CHIP LAW GROUP

(57) ABSTRACT

A speaker apparatus includes a pair of left and right speaker blocks that respectively have acoustic output sections and that are arranged inside a backrest. The pair of speaker blocks are arranged horizontally side by side relative to a headrest located on a front surface side of the backrest, and at least part of the headrest is located within a range of a nominal directivity angle of acoustics output from the acoustic output sections. This ensures that, of the acoustics output from the acoustic output section of the speaker block on the left side, at least some acoustics that head for the right ear are blocked by the headrest and that, of the acoustics output
(Continued)

from the acoustic output section of the speaker block on the right side, at least some acoustics that head for the left ear are blocked by the headrest.

7 Claims, 10 Drawing Sheets

(51) Int. Cl.
*A47C 7/72* (2006.01)
*B60N 2/90* (2018.01)
*H04R 1/28* (2006.01)
*H04R 1/34* (2006.01)
*H04S 1/00* (2006.01)

(52) U.S. Cl.
CPC ........... *H04R 1/2826* (2013.01); *H04R 1/345* (2013.01); *H04S 1/007* (2013.01); *H04R 2499/13* (2013.01)

(58) Field of Classification Search
CPC ......... B60N 2/879; H04S 1/007; B60R 11/02; A47C 7/727; A47C 7/12
USPC .................. 381/301–305, 86, 333, 336, 337, 381/386–389, 395
See application file for complete search history.

(56) References Cited

U.S. PATENT DOCUMENTS

| | | |
|---|---|---|
| 2014/0219492 A1 | 8/2014 | Pelliccio et al. |
| 2018/0118063 A1* | 5/2018 | Oswald .................. B60N 2/879 |
| 2021/0227326 A1* | 7/2021 | Watanabe .............. H04R 5/023 |
| 2022/0379787 A1* | 12/2022 | Lade ...................... B60N 2/879 |

\* cited by examiner

SPEAKER APPARATUS AND CHAIR

CROSS REFERENCE TO RELATED APPLICATIONS

This application is a U.S. National Phase of International Patent Application No. PCT/JP2021/016041 filed on Apr. 20, 2021, which claims priority benefit of Japanese Patent Application No. JP 2020-095562 filed in the Japan Patent Office on Jun. 1, 2020. Each of the above-referenced applications is hereby incorporated herein by reference in its entirety.

TECHNICAL FIELD

The present technology relates to a technical field regarding a speaker apparatus that has a pair of left and right speaker blocks arranged inside a backrest and a chair including the same.

BACKGROUND ART

In speaker apparatuses that output acoustics, recent years have seen an increase in different kinds of usages, and in addition to stationary types used in homes and portable compact types used on the road, there are, for example, types that are used in vehicles such as automobiles, theaters, and the like.

Development of types among such speaker apparatuses that are used in a manner attached to or incorporated in a chair has progressed, and some thereof are incorporated in a chair's backrest and are configured to output acoustics from backward of a user while the user is seated (refer, for example, to PTL 1).

In the speaker apparatus described in PTL 1, a speaker block is incorporated in each of left and right end portions of an upper end portion of the backrest, and the speaker apparatus is configured such that acoustics are output from near left and right shoulders while the user is seated in a chair.

CITATION LIST

Patent Literature

[PTL 1]
JP-T-2019-536352

SUMMARY

Technical Problem

Incidentally, in a speaker apparatus having a pair of left and right speaker blocks, the speaker block arranged on a left side is used for a left ear (L channel), the speaker block arranged on a right side is used for a right ear (R channel), and a high-quality acoustic listening condition is achieved for a user by inputting different acoustics into the left and right ears.

However, in a configuration having the left and right speaker blocks incorporated in the backrest as in the speaker apparatus described in PTL 1, it is likely that some of the acoustics output from the speaker block for the left are input into the right ear and that some of the acoustics output from the speaker block for the right are input into the left ear.

In a state where what is called crosstalk occurs in which acoustics of each channel are input into the ear other than the one into which the acoustics should normally be input and in a case where the crosstalk is severe, there is a risk that a high-quality acoustic listening condition may not be achieved for the user.

Therefore, it is an object of a speaker apparatus and a chair of the present technology to suppress occurrence of crosstalk and achieve a high-quality acoustic listening condition for the user.

Solution to Problem

Firstly, a speaker apparatus according to the present technology includes a pair of left and right speaker blocks that respectively have acoustic output sections and are arranged inside a backrest. The pair of speaker blocks are arranged horizontally side by side relative to a headrest located on a front surface side of the backrest, and at least part of the headrest is located within a range of a nominal directivity angle of acoustics output from the acoustic output sections.

This ensures that, of the acoustics output from the acoustic output section of the speaker block on the left side, at least some acoustics that head for the right ear are blocked by the headrest and that, of the acoustics output from the acoustic output section of the speaker block on the right side, at least some acoustics that head for the left ear are blocked by the headrest.

Secondly, it is desirable that, in the speaker apparatus according to the present technology described above, at least part of the speaker blocks be located backward and downward of the headrest.

This ensures that at least some of the acoustics output from the acoustic output section reach the user who is seated and that at least some of the acoustics output from the acoustic output section are blocked by the headrest.

Thirdly, it is desirable that, in the speaker apparatus according to the present technology described above, a direction of a central axis of a nominal directivity angle of the acoustics output from the acoustic output section be oriented upward relative to a horizontal direction.

This ensures that the acoustics output from the acoustic output section are output upward relative to the horizontal direction.

Fourthly, it is desirable that, in the speaker apparatus according to the present technology described above, an orientation of the acoustic output section be changed as the headrest moves vertically.

This ensures that the acoustic output direction is changed according to the vertical position of the headrest.

Fifthly, it is desirable that, in the speaker apparatus according to the present technology described above, the acoustic output section be changed to an upward orientation as the headrest moves upward and that the acoustic output section be changed to a downward orientation as the headrest moves downward.

This ensures that the acoustics are output in the direction appropriate to the position of a user's head.

Sixthly, it is desirable that, in the speaker apparatus according to the present technology described above, a duct having a sound guiding space formed therein be provided in the speaker block, that low-pitched acoustics be output to the acoustic output section from an output port of the duct, and that the acoustic output section and the output port be located at the same vertical height.

This ensures that the low-pitched acoustics output via the duct are output from the position at the same height as that of medium- to high-pitched acoustics from the acoustic output section.

Seventhly, a chair according to the present technology includes a backrest, a pair of left and right speaker blocks, and a headrest. The backrest functions as a support for the back. The pair of left and right speaker blocks respectively have acoustic output sections and are arranged inside the backrest. The headrest is located on a front surface side of the backrest. The pair of speaker blocks are arranged horizontally side by side relative to the headrest, and at least part of the headrest is located within a range of a nominal directivity angle of acoustics output from the acoustic output sections.

This ensures that, of the acoustics output from the acoustic output section of the speaker block on the left side, at least some acoustics that head for the right ear are blocked by the headrest and that, of the acoustics output from the acoustic output section of the speaker block on the right side, at least some acoustics that head for the left ear are blocked by the headrest.

DESCRIPTION OF EMBODIMENT

Figure 1:
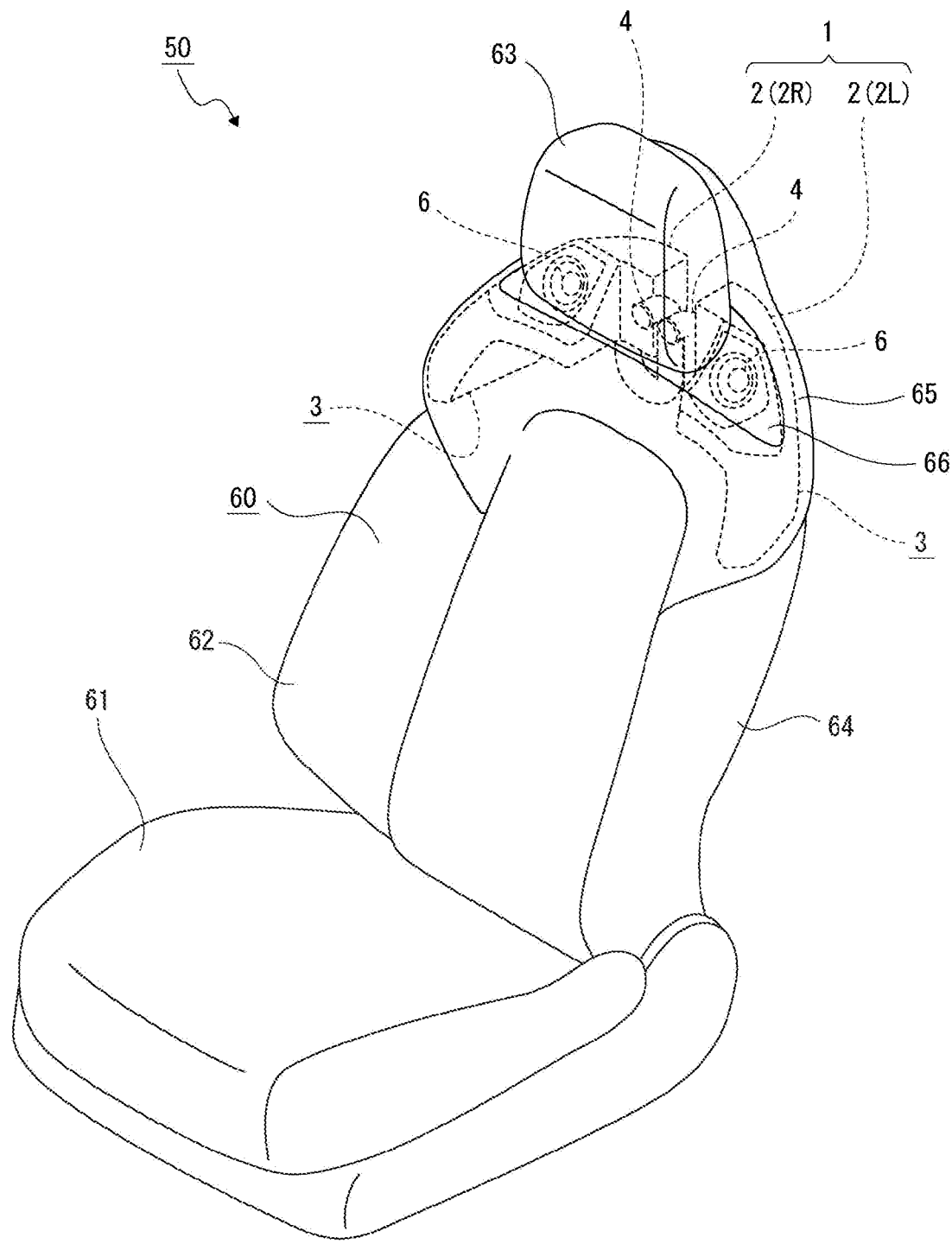
FIG. 1 illustrates, together with FIGS. 2 to 11, an embodiment of a speaker apparatus and a chair of the present technology, and is a perspective view of the chair.

A description will be given below of an embodiment of a speaker apparatus and a chair of the present technology in accordance with the attached drawings.

It should be noted that the speaker apparatus illustrated below is arranged inside a backrest and that, in the description given below, longitudinal, vertical, and horizontal directions represent those when a user is seated in the chair.

It should be noted, however, that the longitudinal, vertical, and horizontal directions given below are merely for reasons of description and that the embodiment of the present technology are not limited to these directions.

<Schematic Configuration of the Chair>

A description will be given first of a schematic configuration of a chair 50 (refer to FIGS. 1 to 3).

The chair 50 is used as a seat in a traveling vehicle such as an automobile. It should be noted, however, that the chair 50 is not limited to the traveling vehicle's seat and may be a chair used in accompaniment with a table in a home or a chair used in a living room or other places. Also, the chair 50 may be, for example, a chair in which one sits when playing a game, a massage chair, a chair in which one sits when watching a movie in a movie theater or the like, a chair in which one sits when watching a play or the like in a theater or the like, a chair in which one sits when watching a sport in a stadium or the like, or a chair in a traveling vehicle other than an automobile, such as an aircraft, a ship, or a railroad car.

The chair 50 includes a seating section 60 and a speaker apparatus 1, and a headrest 63 is located on a front surface side of an upper end portion of the seating section 60, and the speaker apparatus 1 is arranged inside the seating section 60.

The seating section 60 has a seat 61, a backrest 62, and a headrest 63. A user 100 sits in the seat 61. The backrest 62 functions as a support for the back. A head 101 of the user 100 is placed on the headrest 63 from the front.

The backrest 62 has a back receiving section 64 and an arrangement section 65. The back of the user 100 is placed on the back receiving section 64. The arrangement section 65 is located near and backward of both shoulders of the user 100 when the user 100 sits. A grill 66 is attached to a front surface section of the arrangement section 65.

The headrest 63 is supported by the backrest 62 on the front surface side of the upper end portion of the backrest 62 and can move vertically relative to the backrest 62. It is possible to adjust the position of the headrest 63 relative to the head 101 by moving the headrest 63 vertically relative to the backrest 62.

It should be noted that the headrest 63 may be capable of not only being moved vertically but also being tilted relative to the backrest 62.

<Configuration of the Speaker Apparatus>

A description will be given next of a configuration of the speaker apparatus 1 (refer to FIGS. 1 to 7).

Figure 2:
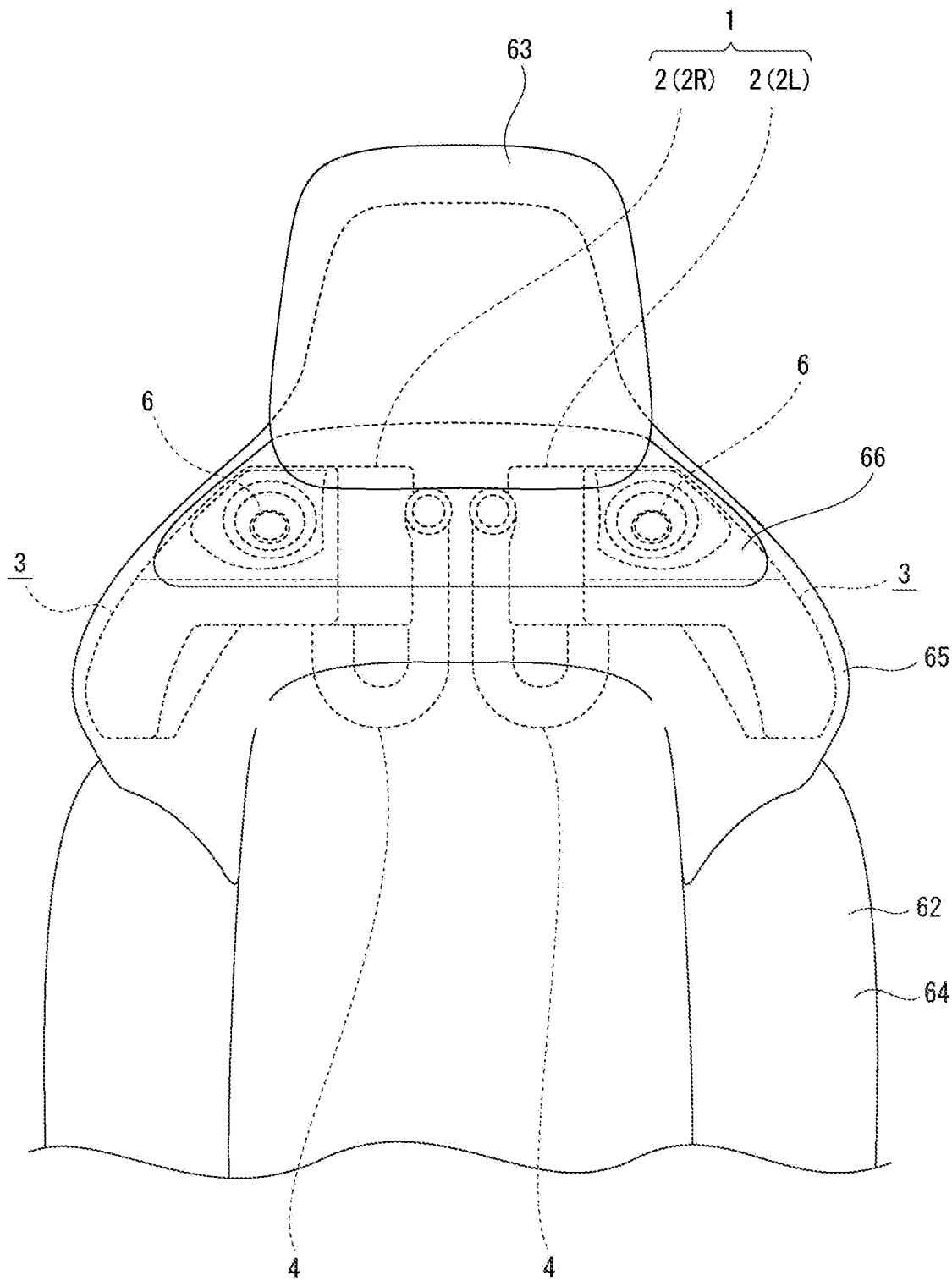
FIG. 2 is a front view illustrating part of the chair.

The speaker apparatus 1 includes a pair of left and right speaker blocks 2 and 2 (2L and 2R), and the speaker block 2L and the speaker block 2R are formed in shapes of left and right line-symmetric portions (refer to FIGS. 1 and 2). The speaker block 2L on the left side is an L channel unit for a left ear 102 of the user 100, and the speaker block 2R on the right side is an R channel unit for a right ear 103 of the user 100.

Figure 3:
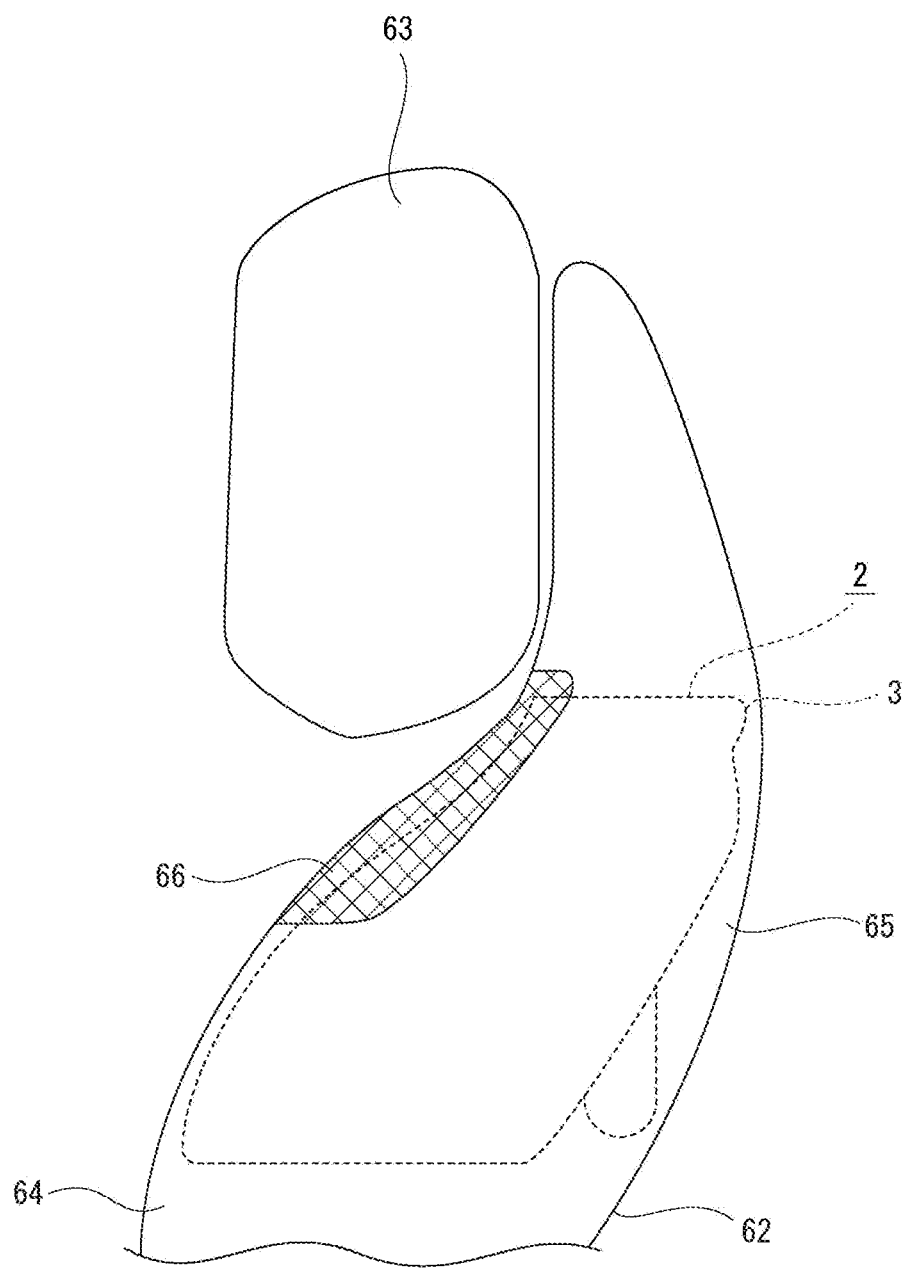
FIG. 3 is a side view illustrating part of the chair.
Figure 4:
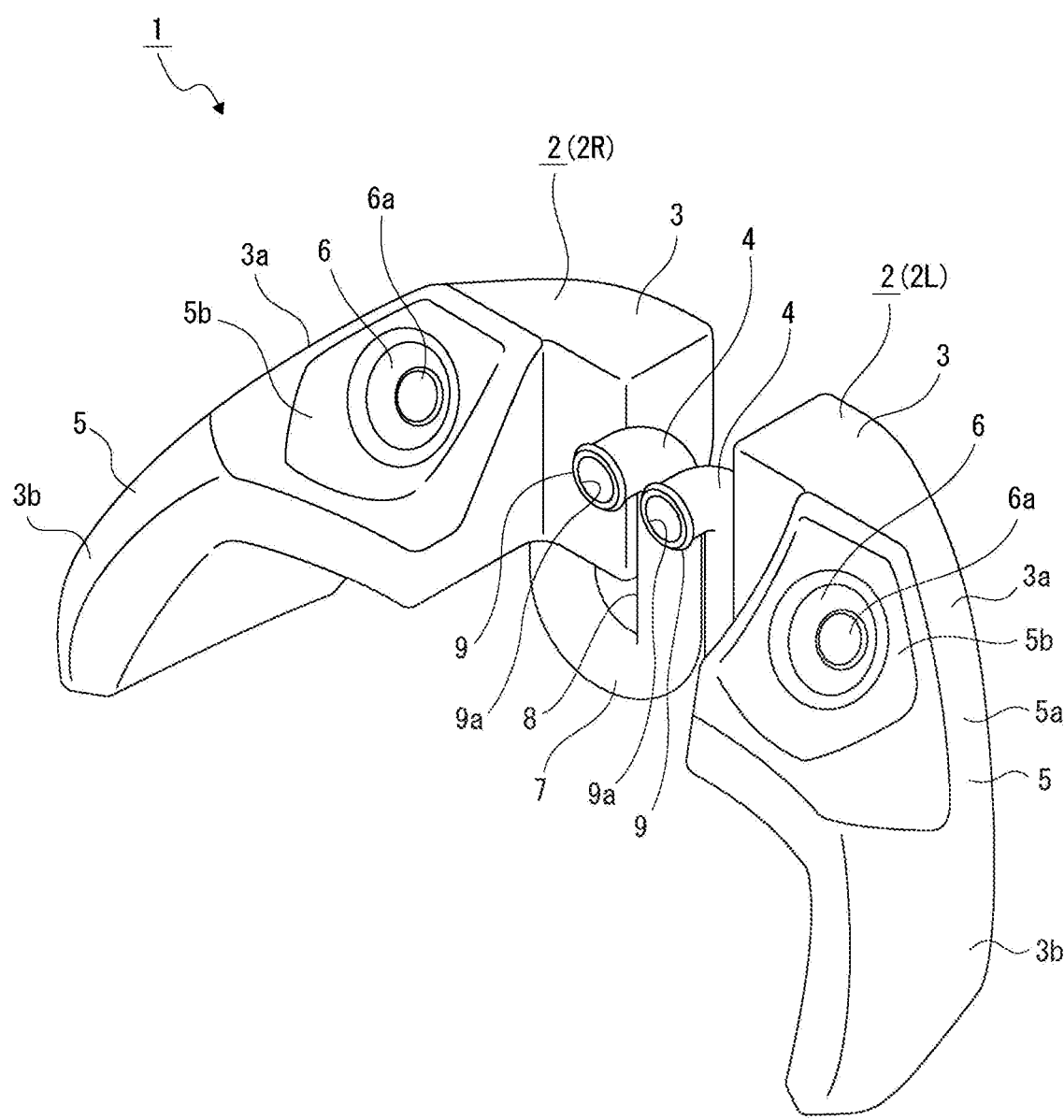
FIG. 4 is a perspective view of the speaker apparatus.

The speaker blocks 2 and 2 are arranged inside the arrangement section 65 of the backrest 62 and located on the back side of the grill 66 (refer to FIG. 3). The speaker blocks 2 and 2 are arranged horizontally side by side relative to the headrest 63, and the upper end portions are located approximately at the same height as that of a lower end portion of the headrest 63 (refer to FIGS. 2 and 3).

The speaker blocks 2 and 2 each have a main body section 3 and a duct 4 and are configured as a bass reflex type. The main body section 3 outputs medium- to high-pitched acoustics. The duct 4 has an end portion that is continuous with the main body section 3 and outputs low-pitched acoustics (refer to FIGS. 4 and 5).

The main body section 3 includes required sections that are arranged inside and outside of a casing 5, and the casing 5 has a side surface section 5a that is formed as a curved surface section that is displaced laterally outward as it goes downward to suit the shape of a side surface section of the arrangement section 65 of the backrest 62.

The main body section 3 has a base section 3a and a protruding portion 3b. The base section 3a has an acoustic output section 6. The protruding portion 3b projects approximately downward from the base section 3a. The protruding portion 3b projects from a horizontal outer end portion of the base section 3a.

The acoustic output section 6 has a magnetic driving section that has a magnet, a coil, and the like and that is not illustrated, and a vibration plate 6a is attached to a front surface section 5b of the casing 5. In the acoustic output section 6, a center of the vibration plate 6a is used as a center of acoustic output, the vibration plate 6a is tilted upward relative to the longitudinal direction, and an axial direction of a central axis J of a nominal directivity angle of the acoustics is oriented upward relative to the horizontal direction (refer to FIG. 6).

Figure 7:
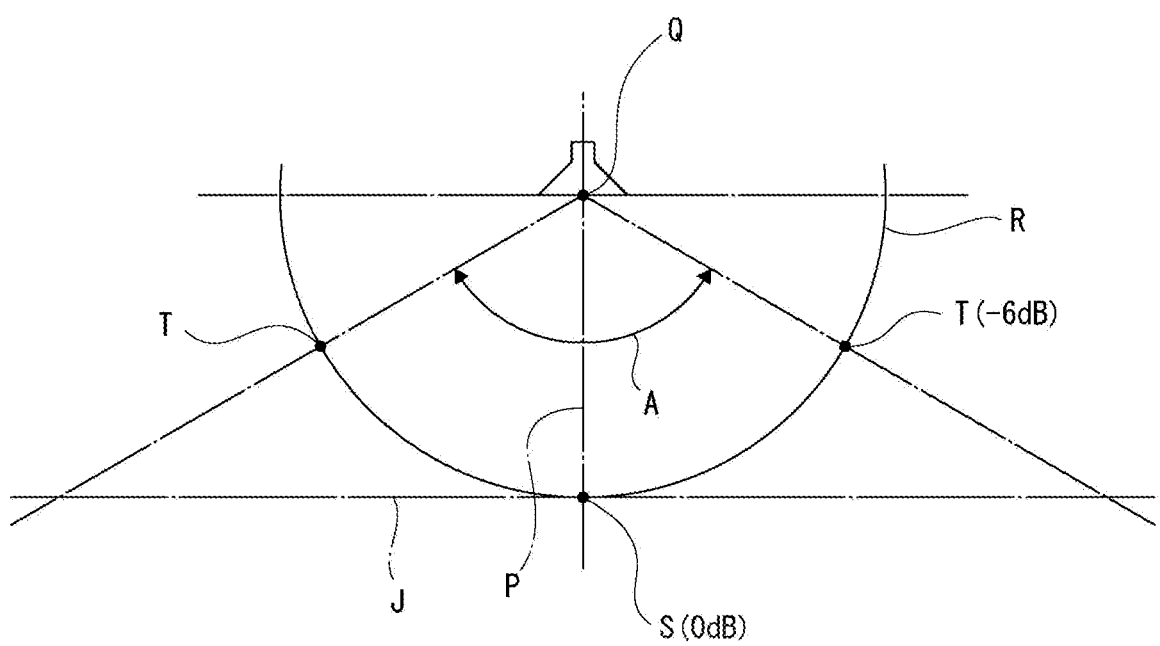
FIG. 7 is a diagram describing a directivity angle of the speaker apparatus.

In general, the nominal directivity angle of a speaker apparatus can be acquired by measuring a sound pressure level on a 360-degree circumference when a given electrical input is applied (refer to FIG. 7).

The nominal directivity angle of a speaker apparatus is an "opening angle when the sound pressure decreases by 6 db SPL (absolute value) from the axial sound pressure level" assuming that the acoustic output direction from the speaker apparatus is in the direction of the central axis J when the sound pressure level on a circumference R around an output position Q is measured. Letting a point of the circumference R that intersects the central axis J be denoted as a reference point S and assuming that the sound pressure at the reference point is 0 dB, points T and T are measured where the sound pressure decreased by 6 db SPL from the sound pressure level at the reference point S on the circumference R, the angle between the points T and T with the reference point S therebetween is a nominal directivity angle A, and the nominal directivity angle A is an angle smaller than 180 degrees.

The duct 4 includes a bent portion 7, a straight portion 8, and an output end portion 9. The bent portion 7 is continuous with the lower end portion of the base section 3a of the main body section 3. The straight portion 8 is continuous with the bent portion 7. The output end portion 9 is continuous with the straight portion 8 (refer to FIGS. 4 and 5). The bent portion 7 is formed in the U shape, and a horizontal outer end portion is continuous with the base section 3a. The straight portion 8 is continuous with a horizontal inner end portion of the bent portion 7 and formed in the shape that extends vertically. The output end portion 9 is continuous with the upper end portion of the straight portion 8 and formed in the shape that is bent forward at 90 degrees relative to the straight portion 8 and that extends longitudinally. An opening of the output end portion 9 is formed as an output port 9a from which acoustics are output.

In the speaker blocks 2 and 2, the straight portions 8 and 8 and the output end portions 9 and 9 of the ducts 4 and 4 are located between the main body sections 3 and 3. In consequence, the ducts 4 and 4 do not project horizontally outward from the main body sections 3 and 3, which prevents the arrangement section 65 of the backrest 62 from being formed in the shape having an outwardly protruding portion and makes it possible to achieve compactness and excellent designability of the arrangement section 65.

Figure 5:
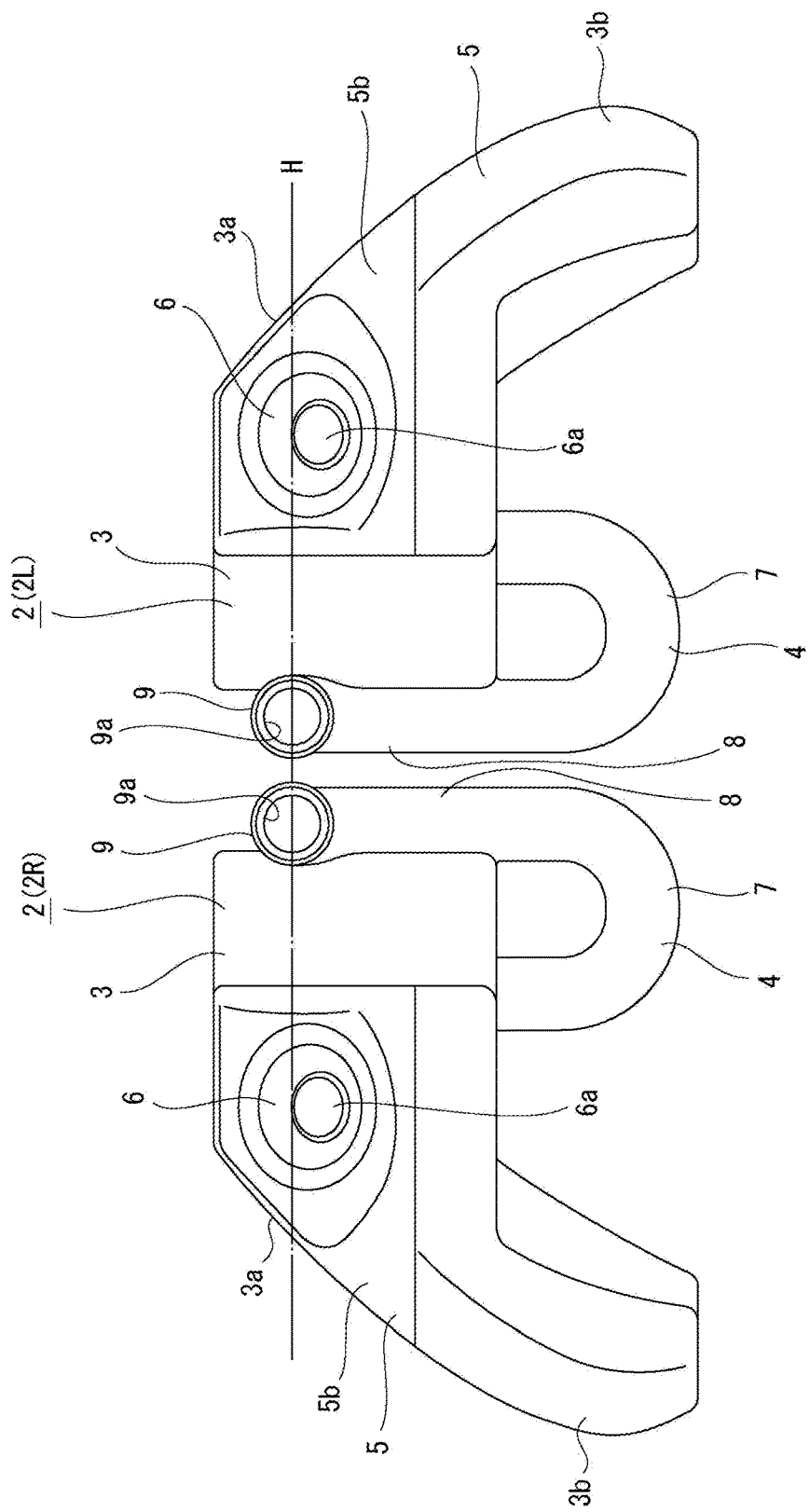
FIG. 5 is a front view of the speaker apparatus.

In the speaker block 2, the acoustic output section 6 and the output port 9a of the duct 4 are located approximately at a same vertical height H (refer to FIG. 5).

Thus, low-pitched acoustics output via the duct 4 are output from the position approximately at the same vertical height as medium- to high-pitched acoustics output from the acoustic output section 6 because the acoustic output section 6 and the output port 9a of the duct 4 are located approximately at the same vertical height H, which makes it possible to output low- to medium-pitched or medium- to high-pitched high-quality acoustics to the user 100.

Figure 6:
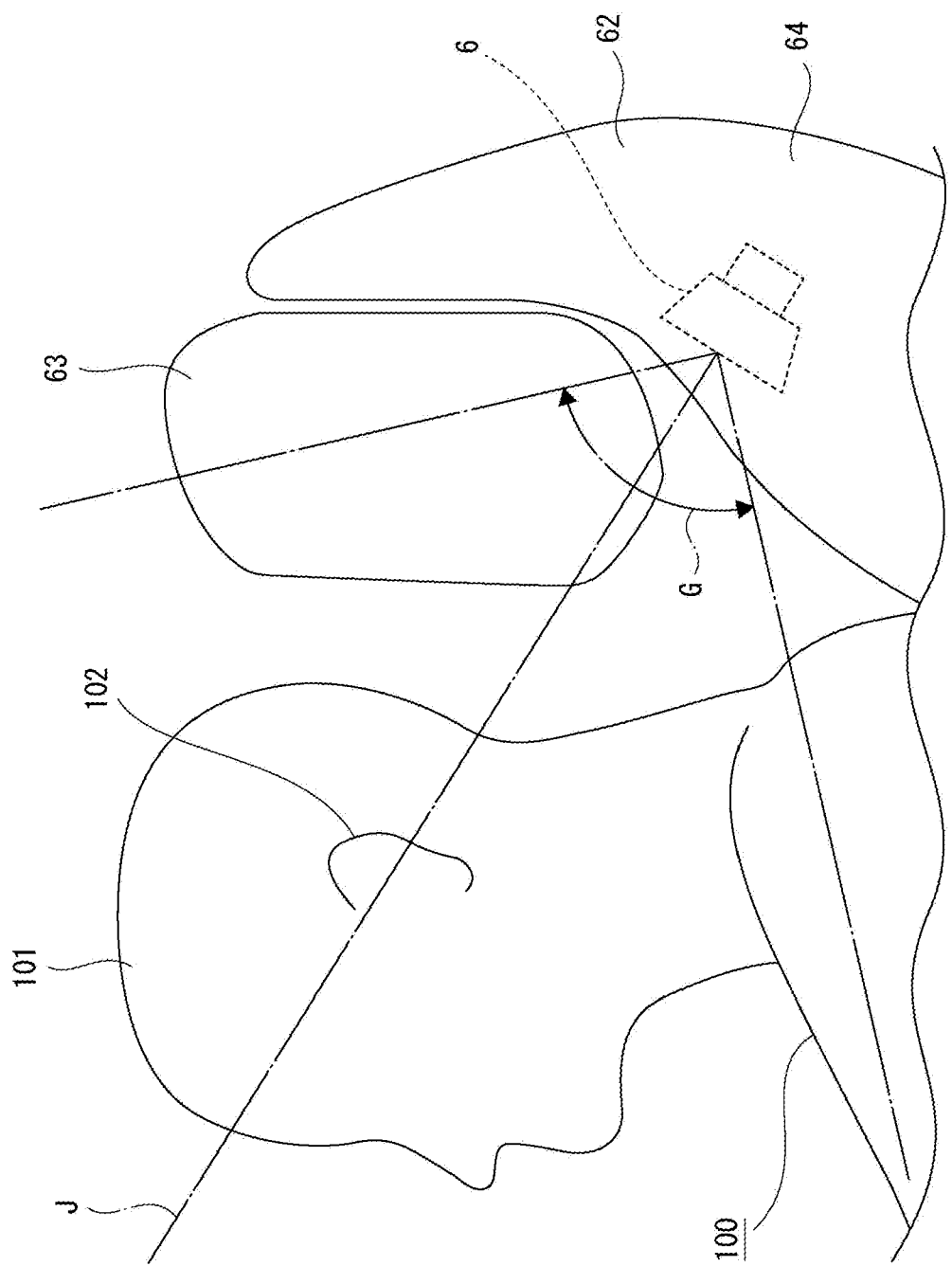
FIG. 6 is a side view illustrating an acoustic output condition.
Figure 8:
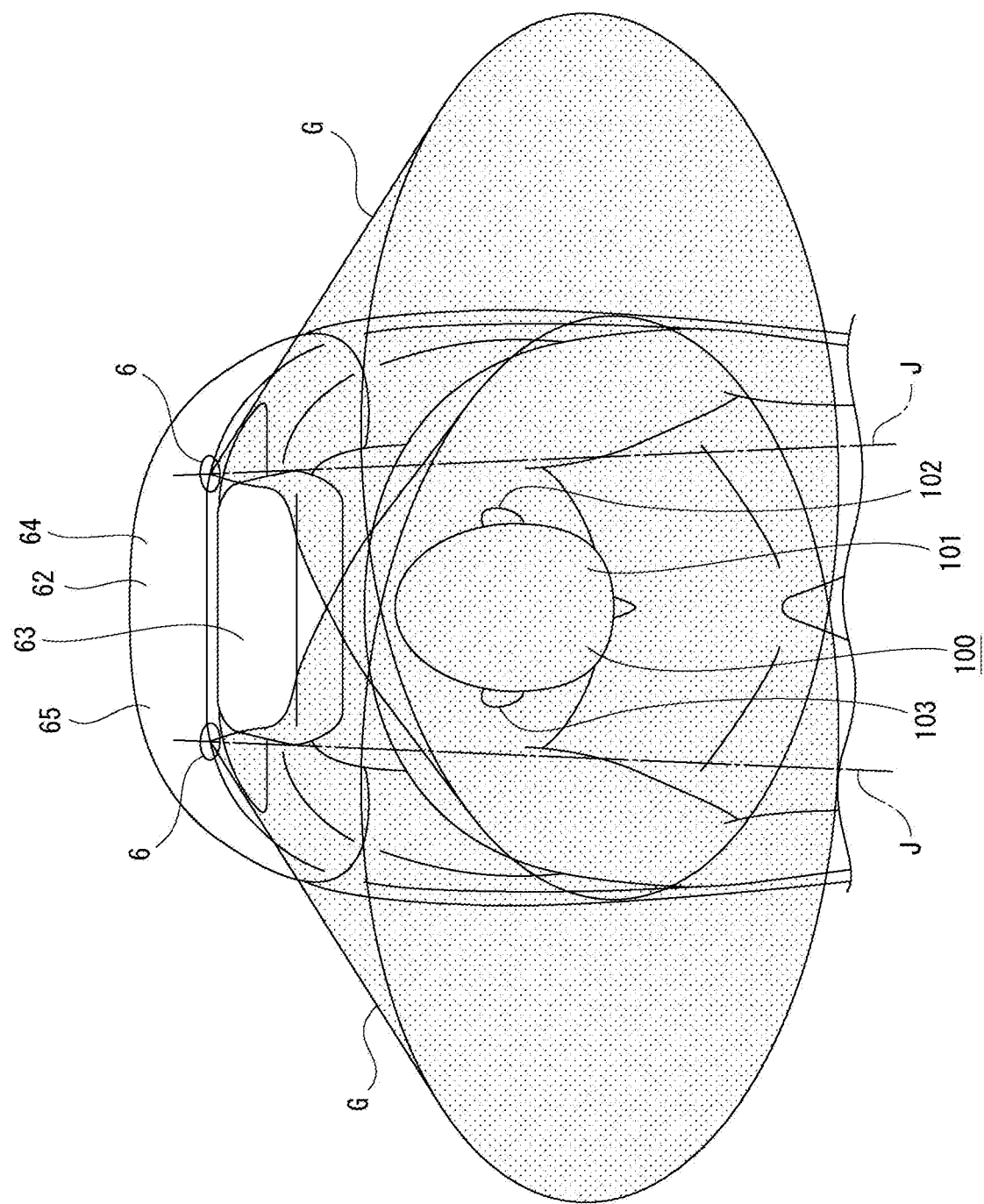
FIG. 8 is a plan view illustrating the acoustic output condition.

In the speaker apparatus 1 configured as described above, the central axes J and J of the speaker block 2L and the speaker block 2R are oriented upward relative to the horizontal direction (refer to FIGS. 6 and 8). Also, the central axes J and J are parallel along both side surfaces of the headrest 63 (refer to FIG. 8).

The ranges of the nominal directivity angle of acoustics output from the speaker blocks 2 and 2 are represented by conic ranges G and G respectively having origins at the speaker blocks 2 and 2, and the speaker apparatus 1 is configured such that part of the headrest 63 is located within the ranges G and G.

<Acoustic Output from the Speaker Apparatus>

In the speaker apparatus 1 configured as described above, when acoustics are output from the speaker blocks 2 and 2, the output acoustics propagate toward the user 100 via the grill 66. At this time, although the acoustics output from the acoustic output sections 6 and 6 propagate toward the user 100 respectively within the ranges G and G of the nominal directivity angle, respective parts of the headrest 63 are located in the ranges G and G of the nominal directivity angle (refer to FIGS. 6 and 8).

In consequence, of the acoustics output from the acoustic output section 6 of the speaker block 2L on the left side, at least some acoustics that head for the right ear 103 are blocked by the headrest 63, and of the acoustics output from the acoustic output section 6 of the speaker block 2R on the right side, at least some acoustics that head for the left ear 102 are blocked by the headrest 63.

When acoustics are output from the speaker block 2, medium- to high-pitched acoustics are output from the acoustic output section 6 and low-pitched acoustics are output from the duct 4, and complementation by the duct 4 with low-pitched acoustics allows the user 100 to listen to low- to high-pitched high-quality acoustics.

It should be noted that, although the duct 4 having the bent portion 7 in the U shape is cited as an example in the above description, the duct 4 may be formed in a linear shape as a whole. For example, a linear duct may be provided to project upward from the main body section 3, and alternatively, a linear duct may be provided to project downward from the main body section 3. Also, the speaker apparatus 1 is not limited to the bass reflex type having a duct and may be a closed type having no duct.

CONCLUSION

As described above, the speaker apparatus 1 and the chair 50 having the speaker apparatus 1 include the pair of left and right speaker blocks 2 and 2 that respectively have the acoustic output sections 6 and 6 and are arranged inside the backrest 62. The pair of speaker blocks 2 and 2 are arranged horizontally side by side relative to the headrest 63 located on the front surface side of the backrest 62, and at least part of the headrest 63 is located within the ranges G and G of the nominal directivity angle of acoustics output from the acoustic output sections 6 and 6.

In consequence, of the acoustics output from the acoustic output section 6 of the speaker block 2L on the left side, at least some acoustics that head for the right ear 103 are blocked by the headrest 63, and of the acoustics output from the acoustic output section 6 of the speaker block 2R on the right side, at least some acoustics that head for the left ear 102 are blocked by the headrest 63. This suppresses occurrence of what is called crosstalk in which acoustics of each channel are input into the ear other than the one into which the acoustics should normally be input and achieves a high-quality acoustic listening condition for the user 100.

Also, in the speaker apparatus 1, the speaker blocks 2 and 2 are arranged in the orientation in which the central axes J and J extend along the side surfaces of the headrest 63 as described above, and the central axes J and J are not tilted horizontally so as to be oriented toward the side of the user 100.

In consequence, the center of the acoustics output from the acoustic output section 6 is not oriented toward the side of the right ear 103 of the speaker block 2L on the left side, and the center of the acoustics output from the acoustic output section 6 is not oriented toward the side of the left ear 102 of the speaker block 2R on the right side, which makes it possible to further suppress occurrence of crosstalk and achieve an even higher-quality acoustic listening condition for the user 100.

It should be noted, however, that, in the speaker apparatus 1, the central axes J and J may be tilted horizontally to the extent where an excellent acoustic listening condition can be achieved.

Further, at least part of the speaker blocks 2 and 2 are located backward and downward of the headrest 63.

In consequence, at least some of the acoustics output from the acoustic output sections 6 and 6 reach the user 100 who is seated in the chair 50, and at least some of the acoustics output from the acoustic output sections 6 and 6 are blocked by the headrest 63, which makes it possible to reliably suppress crosstalk.

Further, the directions of the central axes J and J of the nominal directivity angle of the acoustics output from the acoustic output sections 6 and 6 are oriented upward relative to the horizontal direction.

In consequence, the acoustics output from the acoustic output sections 6 and 6 are output upward relative to the horizontal, which makes it possible to output acoustics having high sound pressures to the user 100 who is seated in the chair 50.

<Movement of the Headrest and Orientations of the Acoustic Output Sections>

A description will be given next of the movement of the headrest 63 and the orientations of the acoustic output sections 6 (refer to FIGS. 9 to 11).

As described above, the headrest 63 can move vertically relative to the backrest 62, and the chair 50 may be configured such that the orientation of the acoustic output section 6 is changed as described below as the headrest 63 moves vertically.

It should be noted that the orientation of the acoustic output section 6 may also be changed by the change of the orientation of the speaker block 2 as a whole or by the change of the orientation of the acoustic output section 6 relative to the casing 5 of the speaker block 2. Also, a driving mechanism may be provided in the chair 50 so that the orientation of the acoustic output section 6 is changed automatically by the driving mechanism as the headrest 63 moves vertically, and an operation section for adjustment may be provided in the chair 50 so that the orientation of the acoustic output section 6 is changed by manually operating the operation section as the headrest 63 moves vertically.

The headrest 63 can move relative to the backrest 62, for example, between an upper position which is an upward movement end and a lower position which is a lower movement end with a standard position used as a reference. The vertical movement of the headrest 63 is carried out by the user 100 according to the height, the posture, and the like of the user 100 who is seated in the chair 50.

Figure 9:
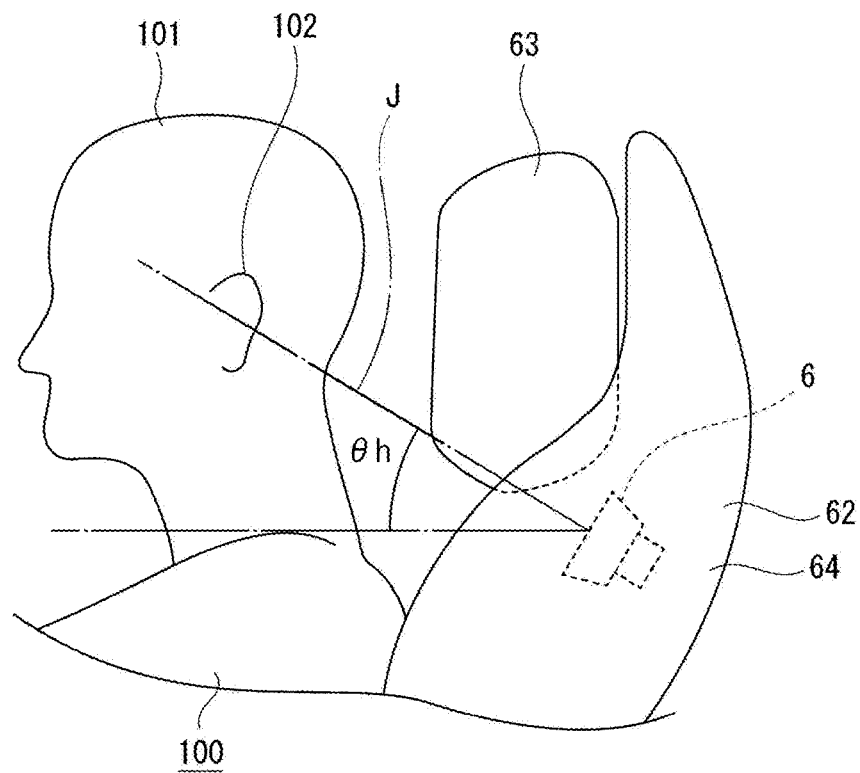
FIG. 9 illustrates, together with FIGS. 10 and 11, a configuration that changes an orientation of an acoustic output section as a headrest moves, and is a side view illustrating a condition in which the headrest is at a standard position and a central axis of the acoustic output section is set at a reference angle.

With the headrest 63 at the standard position, the acoustic output section 6 is oriented such that the central axis J is set at a reference angle $\theta h$, and the reference angle $\theta h$ is, for example, 30 to 50 degrees upward relative to the horizontal direction (refer to FIG. 9). When the acoustic output section 6 is at the reference angle $\theta h$, and with the head 101 of the user 100 directly in front of the headrest 63, the central axis J approximately matches the left ear 102 and the right ear 103 of the user 100.

Figure 10:
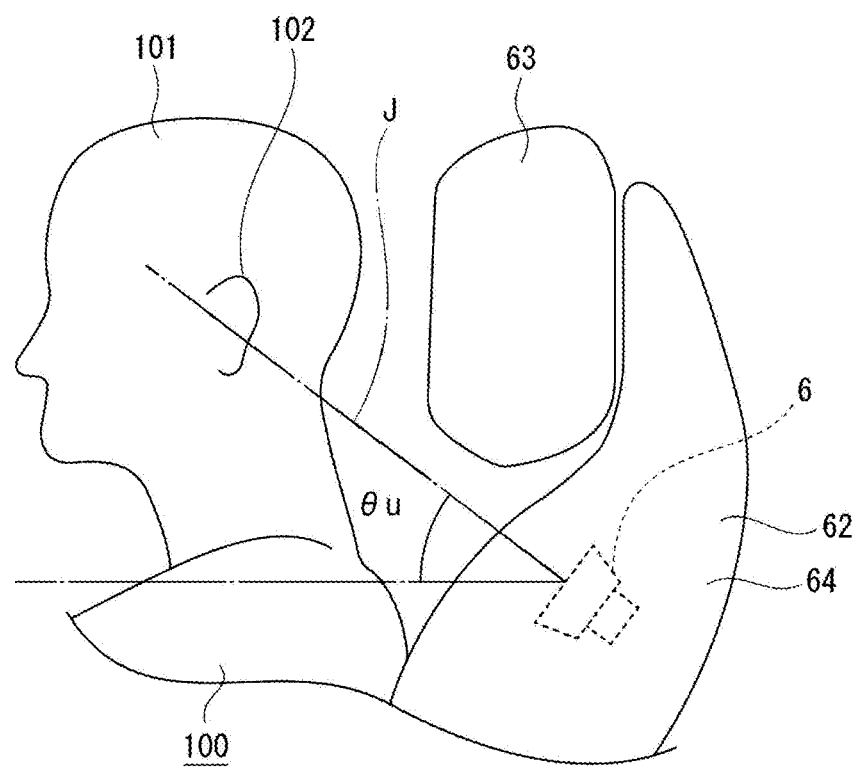
FIG. 10 is a side view illustrating a condition in which the headrest is moved to an upper position, the orientation of the acoustic output section is changed, and the central axis thereof is set to an upper angle.

When the headrest 63 is moved from the standard position to the upper position, the central axis J of the acoustic output section 6 is changed to a more upward orientation than the reference angle $\theta h$ and is set to an upper angle $\theta u$ which is the most upward angle (refer to FIG. 10). The upper angle $\theta u$ is, for example, an angle which is 40 to 60 degrees upward relative to the horizontal direction. When the acoustic output section 6 is at the upper angle $\theta u$, and with the head 101 of the user 100 directly in front of the headrest 63, the central axis J approximately matches the left ear 102 and the right ear 103 of the user 100.

Figure 11:
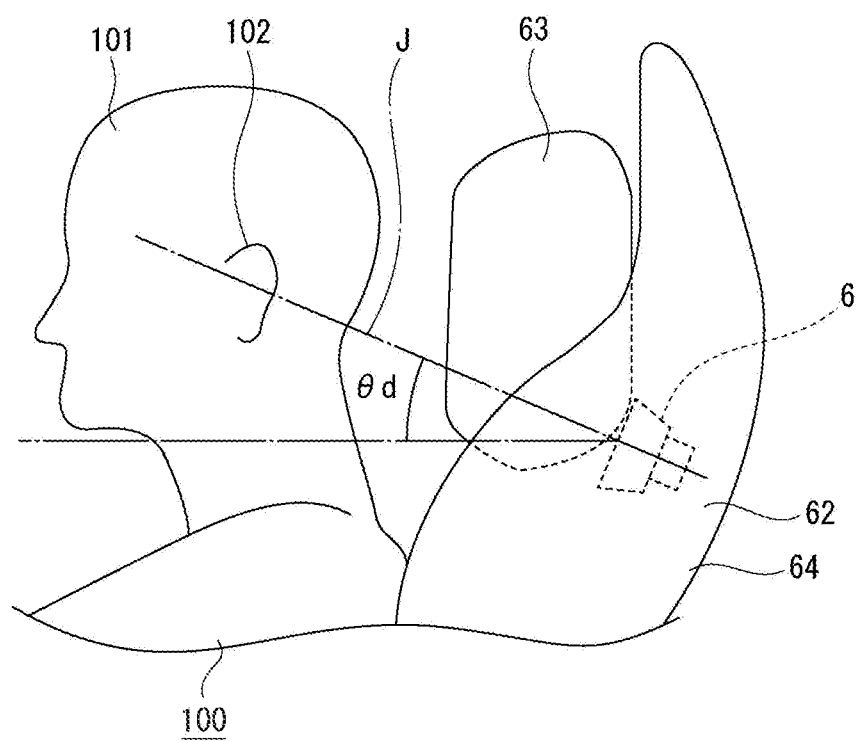
FIG. 11 is a side view illustrating a condition in which the headrest is moved to a lower position, the orientation of the acoustic output section is changed, and the central axis thereof is set to a lower angle.

Meanwhile, when the headrest 63 is moved from the standard position to the lower position, the central axis J of the acoustic output section 6 is changed to a more downward orientation than the reference angle $\theta h$ and is set to a lower angle $\theta d$ which is the most downward angle (refer to FIG. 11). The lower angle $\theta d$ is, for example, an angle which is 20 to 40 degrees upward relative to the horizontal direction. When the acoustic output section 6 is at the lower angle $\theta d$, and with the head 101 of the user 100 directly in front of the headrest 63, the central axis J approximately matches the left ear 102 and the right ear 103 of the user 100.

It should be noted that, although three examples are cited above in which the acoustic output section 6 is changed to three angles, namely, the reference angle $\theta h$, the upper angle $\theta u$, and the lower angle $\theta d$, the acoustic output section 6 may be configured to be held at an angle other than these three angles and may be adjustable in angle with no steps as the headrest 63 moves vertically.

Also, it may be possible to adjust the angles of the acoustic output section 6 of the speaker block 2L on the left side and the acoustic output section 6 of the speaker block 2R on the right side independently of each other.

As described above, in the speaker apparatus 1, the orientation of the acoustic output section 6 is changed as the headrest 63 moves vertically, which changes the acoustic output direction according to the vertical position of the headrest 63 and makes it possible to achieve an excellent acoustic listening condition regardless of the height and posture of the user 100.

Also, the acoustic output section 6 is changed to an upward orientation as the headrest 63 moves upward, and the acoustic output section 6 is changed to a downward orientation as the headrest 63 moves downward, which changes the acoustic output direction to an upward orientation as the headrest 63 moves upward and changes the acoustic output direction to a downward orientation as the headrest 63 moves downward.

In consequence, the acoustics are output in the direction appropriate to the position of the head 101 of the user 100, which makes it possible to achieve an excellent acoustic listening condition regardless of the height and posture of the user 100.

Present Technology

The present technology can have the following configurations.

(1)
A speaker apparatus including:
a pair of left and right speaker blocks that respectively have acoustic output sections and are arranged inside a backrest, in which
the pair of speaker blocks are arranged horizontally side by side relative to a headrest located on a front surface side of the backrest, and
at least part of the headrest is located within a range of a nominal directivity angle of acoustics output from the acoustic output sections.

(2)
The speaker apparatus according to (1), in which
at least part of the speaker blocks is located backward and downward of the headrest.

(3)
The speaker apparatus according to (1) or (2), in which
a direction of a central axis of a nominal directivity angle of the acoustics output from the acoustic output section is oriented upward relative to a horizontal direction.

(4)
The speaker apparatus according to any one of (1) to (3), in which
an orientation of the acoustic output section is changed as the headrest moves vertically.

(5)
The speaker apparatus according to (4), in which
the acoustic output section is changed to an upward orientation as the headrest moves upward, and
the acoustic output section is changed to a downward orientation as the headrest moves downward.

(6)
The speaker apparatus according to any one of (1) to (5), in which
a duct having a sound guiding space formed therein is provided in the speaker block,
low-pitched acoustics are output to the acoustic output section from an output port of the duct, and
the acoustic output section and the output port are located at the same vertical height.

(7)
A chair including:
a backrest adapted to function as a support for the back;
a pair of left and right speaker blocks that respectively have acoustic output sections and are arranged inside the backrest; and
a headrest located on a front surface side of the backrest, in which
the pair of speaker blocks are arranged horizontally side by side relative to the headrest, and
at least part of the headrest is located within a range of a nominal directivity angle of acoustics output from the acoustic output sections.

REFERENCE SIGNS LIST

50: Chair
62: Backrest
63: Headrest
1: Speaker apparatus
2: Speaker block
2L: Speaker block
2R: Speaker block
4: Duct
6: Acoustic output section
9a: Output port

The invention claimed is:

1. A speaker apparatus, comprising:
a casing; and
a pair of a left speaker block and a right speaker block, wherein each of the left speaker block and the right speaker block includes:
a main body section inside and outside of the casing; and
an acoustic output section inside a backrest associated with the speaker apparatus, wherein
the acoustic output section comprises a vibration plate attached to a front surface section of the casing,
the acoustic output section is configured to have an orientation of a specific angle based on a vertical movement of a headrest associated with the speaker apparatus, and
the headrest is on a front surface side of the backrest,
the pair of the left speaker block and the right speaker block is horizontally side by side relative to the headrest,
at least a part of the headrest is within a range of a nominal directivity angle of an acoustics output from the acoustic output section of the left speaker block and the acoustic output section of the right speaker block,
the nominal directivity angle is an angle smaller than 180 degrees,
the nominal directivity angle is based on a measurement of a sound pressure level on a 360 degrees circumference around an output position of the speaker apparatus, and
the sound pressure level on the 360 degrees circumference is measured based on an application of an electrical input on the pair of the left speaker block and the right speaker block.

2. The speaker apparatus according to claim 1, wherein
at least part of the pair of the left speaker block and the right speaker block is backward and downward of the headrest.

3. The speaker apparatus according to claim 1, wherein
a direction of a central axis of the nominal directivity angle of the acoustics output from the acoustic output section of the left speaker block and the acoustic output section of the right speaker block is oriented upward relative to a horizontal direction.

4. The speaker apparatus according to claim 1, wherein
the orientation of the acoustic output section is changed based on the vertical movement of the headrest.

5. The speaker apparatus according to claim 1, wherein
the orientation of the acoustic output section of the left speaker block and the acoustic output section of the right speaker block is changed to an upward orientation based on an upward movement of the headrest, and
the orientation of the acoustic output section of the left speaker block and the acoustic output section of the right speaker block is changed to a downward orientation based on a downward movement of the headrest.

6. The speaker apparatus according to claim 1, wherein
each of the left speaker block and the right speaker block further includes a duct that has a sound guiding space therein, low-pitched acoustics are output to the acoustic output section from an output port of the duct, and the acoustic output section and the output port are located at a same vertical height.

7. A chair, comprising:

a backrest adapted to function as a support for a back;

a headrest on a front surface side of the backrest; and a speaker apparatus, wherein the speaker apparatus comprises:

a casing; and a pair of a left speaker block and a right speaker block, wherein each of the left speaker block and the right speaker block includes:

a main body section inside and outside of the casing; and an acoustic output section inside the backrest, wherein the acoustic output section comprises a vibration plate attached to a front surface section of the casing, and the acoustic output section is configured to have an orientation of a specific angle based on a vertical movement of the headrest, the pair of the left speaker block and the right speaker block is horizontally side by side relative to the headrest, at least part of the headrest is within a range of a nominal directivity angle of an acoustics output from the acoustic output section of the left speaker block and the acoustic output section of the right speaker block, the nominal directivity angle is an angle smaller than 180 degrees, the nominal directivity angle is based on a measurement of a sound pressure level on a 360 degrees circumference around an output position of the speaker apparatus, and the sound pressure level on the 360 degrees circumference is measured based on an application of an electrical input on the pair of the left speaker block and right speaker block.

* * * * *